US010099765B2

(12) United States Patent
Paci et al.

(10) Patent No.: US 10,099,765 B2
(45) Date of Patent: Oct. 16, 2018

(54) MONOLITHIC COMPOSITE STRUCTURES FOR VEHICLES

(75) Inventors: Robert Paci, Huntington Beach, CA (US); Daniel Flores, La Habra, CA (US); Faustino A. Ayson, Torrance, CA (US)

(73) Assignee: The Boeing Company, Chicago, IL (US)

(*) Notice: Subject to any disclaimer, the term of this patent is extended or adjusted under 35 U.S.C. 154(b) by 653 days.

(21) Appl. No.: 13/569,683

(22) Filed: Aug. 8, 2012

(65) Prior Publication Data

US 2014/0042271 A1 Feb. 13, 2014

(51) Int. Cl.
*B64C 1/06* (2006.01)
*B29C 70/30* (2006.01)
*B29L 31/30* (2006.01)
*B64C 1/00* (2006.01)

(52) U.S. Cl.
CPC .............. *B64C 1/061* (2013.01); *B29C 70/30* (2013.01); *B29L 2031/3076* (2013.01); *B64C 2001/0072* (2013.01); *Y02T 50/43* (2013.01); *Y10T 428/24273* (2015.01); *Y10T 428/24777* (2015.01)

(58) Field of Classification Search
CPC .................................. B64C 1/20; B64C 1/061
USPC ....... 244/118.1, 139, 119, 120; 52/694, 840, 52/851
See application file for complete search history.

(56) References Cited

U.S. PATENT DOCUMENTS

| 3,333,389 | A | * | 8/1967 | Lichti ............................. 52/840 |
| 4,084,029 | A | * | 4/1978 | Johnson et al. ............. 428/119 |
| 4,531,695 | A | * | 7/1985 | Swinfield ...................... 244/119 |
| 4,593,870 | A | * | 6/1986 | Cronkhite .............. B64C 1/062 |
| | | | | 188/375 |
| 4,734,146 | A | * | 3/1988 | Halcomb et al. ............. 156/148 |
| 5,024,399 | A | * | 6/1991 | Barquet et al. ............... 244/119 |
| 6,415,577 | B1 | * | 7/2002 | Curtis ............................. 52/840 |
| 6,976,343 | B2 | * | 12/2005 | McGushion .................... 52/840 |
| 7,818,945 | B2 | * | 10/2010 | Gregg et al. ..................... 52/837 |
| 8,695,922 | B2 | | 4/2014 | Schroeer et al. |
| 2004/0040252 | A1 | * | 3/2004 | Beral et al. .................. 52/729.3 |
| 2008/0210820 | A1 | | 9/2008 | Kismarton et al. |

(Continued)

FOREIGN PATENT DOCUMENTS

CN 101952166 A 1/2011
DE 102007030026 A1 1/2009

(Continued)

OTHER PUBLICATIONS

Federal Service for Intellectual Property Office Action and English Translation, dated Aug. 17, 2017, regarding Application No. 201313032611, 20 pages.

(Continued)

*Primary Examiner* — Jessica B Wong
(74) *Attorney, Agent, or Firm* — Yee & Associates, P.C.

(57) ABSTRACT

A method and apparatus comprising a monolithic composite structure, a first edge of the monolithic composite structure, and a second edge of the monolithic composite structure. The first edge of the monolithic composite structure has a first shape configured to be connected to a structure in a vehicle. The second edge of the monolithic composite structure has a second shape configured to be connected to a body of the vehicle.

19 Claims, 15 Drawing Sheets

(56) References Cited

U.S. PATENT DOCUMENTS

| | | |
|---|---|---|
| 2010/0090061 A1 | 4/2010 | Kolax et al. |
| 2010/0263976 A1 | 10/2010 | Tanaka et al. |
| 2010/0308165 A1 | 12/2010 | Markowski et al. |
| 2011/0027526 A1 | 2/2011 | McCarville et al. |
| 2011/0311782 A1 | 12/2011 | Richmond et al. |
| 2012/0034416 A1 | 2/2012 | Lutz |
| 2013/0009008 A1 | 1/2013 | Westphal et al. |

FOREIGN PATENT DOCUMENTS

| | | |
|---|---|---|
| FR | 2903961 A1 | 1/2008 |
| JP | H06506885 A | 8/1994 |
| JP | 2012510395 A | 5/2012 |
| RU | 2008147137 A | 7/2010 |
| WO | WO9218324 A1 | 10/1992 |
| WO | WO2007141291 A1 | 12/2007 |

OTHER PUBLICATIONS

European Patent Office Examination Report, dated Oct. 10, 2017, regarding Application No. 13174316.3, 7 pages.

Russian Office Action, dated Aug. 17, 2017, regarding Application No. 2013130326, 13 pages.

State Intellectual Property Office of PRC Notification of Second Office Action and English Translation, dated Nov. 22, 2016, regarding application No. 201310343238.X, 20 pages.

State Intellectual Property Office of PRC Notification of Third Office Action, dated Jun. 28, 2017, regarding Application No. 201310343238.X, 5 pages.

Notice of Reasons for Rejection and English Translation, regarding Japanese Patent Application No. 2013-163769, dated May 30, 2017, 6 pages.

Federal Service for Intellectual Property Office Action and English Translation, dated May 26, 2017, regarding Application No. 2013130326/11, 9 pages.

\* cited by examiner

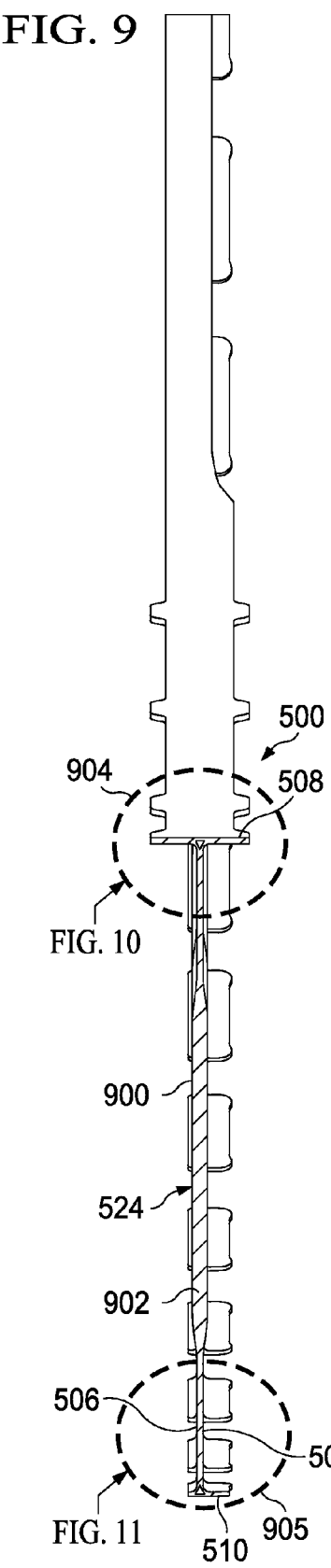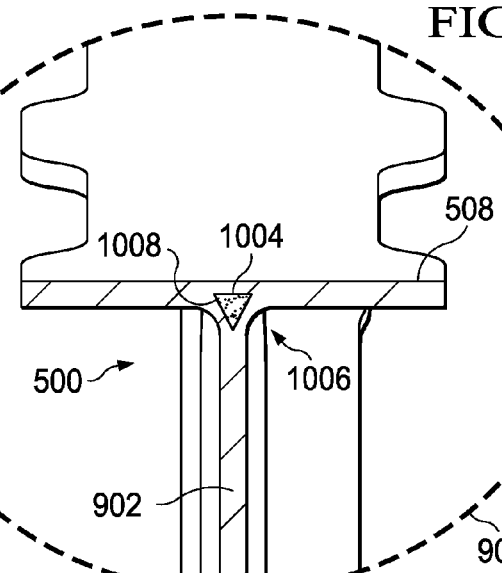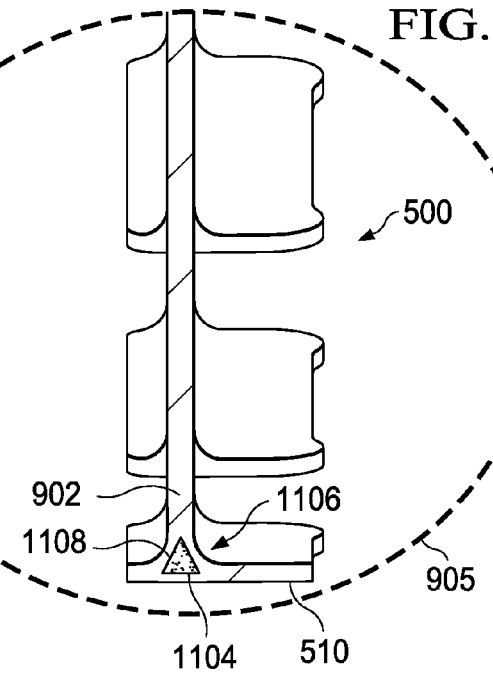

FIG. 12
FIG. 13
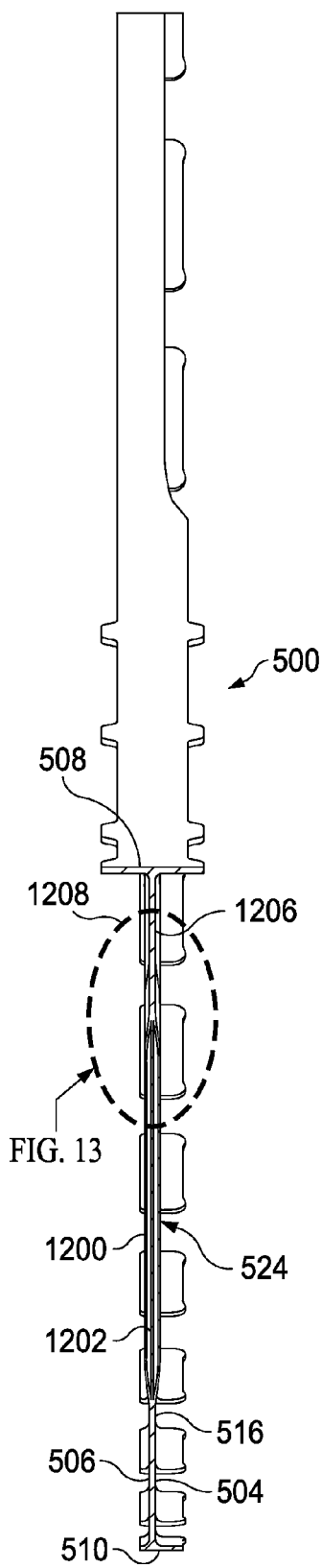
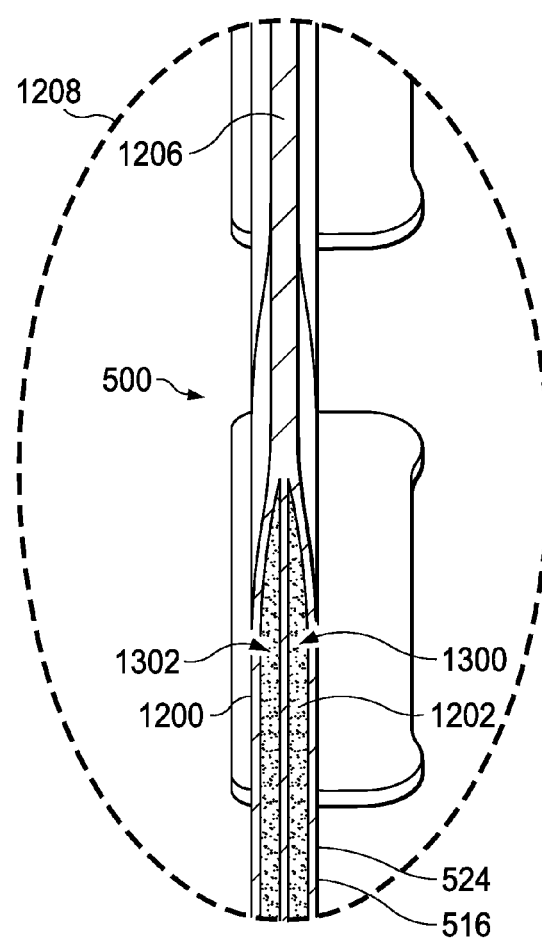

MONOLITHIC COMPOSITE STRUCTURES FOR VEHICLES

BACKGROUND INFORMATION

1. Field

The present disclosure relates generally to vehicles and, in particular, to structures for vehicles. Still more particularly, the present disclosure relates to a method and apparatus for frames in a support system for a vehicle.

2. Background

Many vehicles have a main body in which different components may be located. For example, a surface ship has a main body in the form of a hull. In another example, an aircraft has a main body in the form of a fuselage.

With respect to an aircraft, support systems may be present within the fuselage of the aircraft to provide support for various components. For example, an aircraft may have elongated beams that connect to the skin on the fuselage. These elongated beams may provide support for a floor within the fuselage or may attach to other structures within the aircraft. This floor may be for a passenger area, a cargo area, or some other area within the aircraft.

Additionally, curved members may be attached to the skin of the fuselage to provide additional support for the fuselage. These curved members may be, for example, ribs or other types of support structures. Further, members may form a truss structure between the ribs and beams to provide additional support for the fuselage.

Currently, these different components are comprised of metal or composite material. The different components may be connected to each other through fasteners, weld joints, and other suitable means.

Although the structures in the support system of an aircraft provide desirable support for different loads, the structures are often more complex than desired. For example, manufacturing and connecting beams to the ribs and/or including truss structures between the ribs or frames may take more time and effort than desired.

During manufacturing, the different structures are formed through various processes. Thereafter, the structures are assembled through operations that include positioning the structures, drilling holes in the structures, installing fasteners, welding the structures to each other, applying sealant, and other suitable operations. The time needed for these operations may cause the manufacturing and assembly of an aircraft or other vehicle to take longer than desired. Therefore, would be desirable to have a method and apparatus that takes into account at least some of the issues discussed above, as well as other possible issues.

SUMMARY

In one illustrative embodiment, an apparatus comprises a monolithic composite structure, a first edge of the monolithic composite structure, and a second edge of the monolithic composite structure. The first edge of the monolithic composite structure has a first shape configured to be connected to a structure in a vehicle. The second edge of the monolithic composite structure has a second shape configured to be connected to a body of the vehicle.

In another illustrative embodiment, a support system for an aircraft comprises a plurality of frames. A frame in the plurality of frames comprises a monolithic composite structure, a first edge of the monolithic composite structure, and a second edge of the monolithic composite structure. The first edge of the monolithic composite structure has a first shape configured to support a floor in the aircraft. The second edge of the monolithic composite structure has a second shape configured to be connected to a fuselage of the aircraft.

In yet another illustrative embodiment, a method for operating a vehicle is present. The vehicle is operated. A number of structures are supported in the vehicle with a support system having a number of frames. A frame in the number of frames comprises a monolithic composite structure, a first edge of the monolithic composite structure, and a second edge of the monolithic composite structure. The first edge of the monolithic composite structure has a first shape configured to support the number of structures in the vehicle. The second edge of the monolithic composite structure has a second shape configured to be connected to a body of the vehicle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is an illustration of a cross-sectional view of a frame in accordance with an illustrative embodiment;

FIG. 10 is an illustration of a detailed view of an edge of a frame in accordance with an illustrative embodiment;

FIG. 11 is an illustration of a detailed view of an edge of a frame in accordance with an illustrative embodiment;

FIG. 12 is an illustration of a cross-sectional view of a frame in accordance with an illustrative embodiment;

FIG. 13 is a more detailed illustration of a portion of a cross-sectional view of a frame in accordance with an illustrative embodiment;

DETAILED DESCRIPTION

The illustrative embodiments recognize and take into account one or more different considerations. For example, the illustrative embodiments recognize and take into account that in addition to taking more time to manufacture, the amount of maintenance for structures in a support system with many components may be greater than desired. For example, a truss structure within a support system for an aircraft may require regular inspections. During these inspections, each component in the support system may be examined. Further, manufacturing the different components may require more tools than desired. For example, tools for stamping parts, extruding parts, cutting parts, and other operations may be required.

Thus, the illustrative embodiments provide a method and apparatus for a support system that includes monolithic composite structures. These monolithic composite structures may take the form of frames formed from composite materials.

Figure 1:
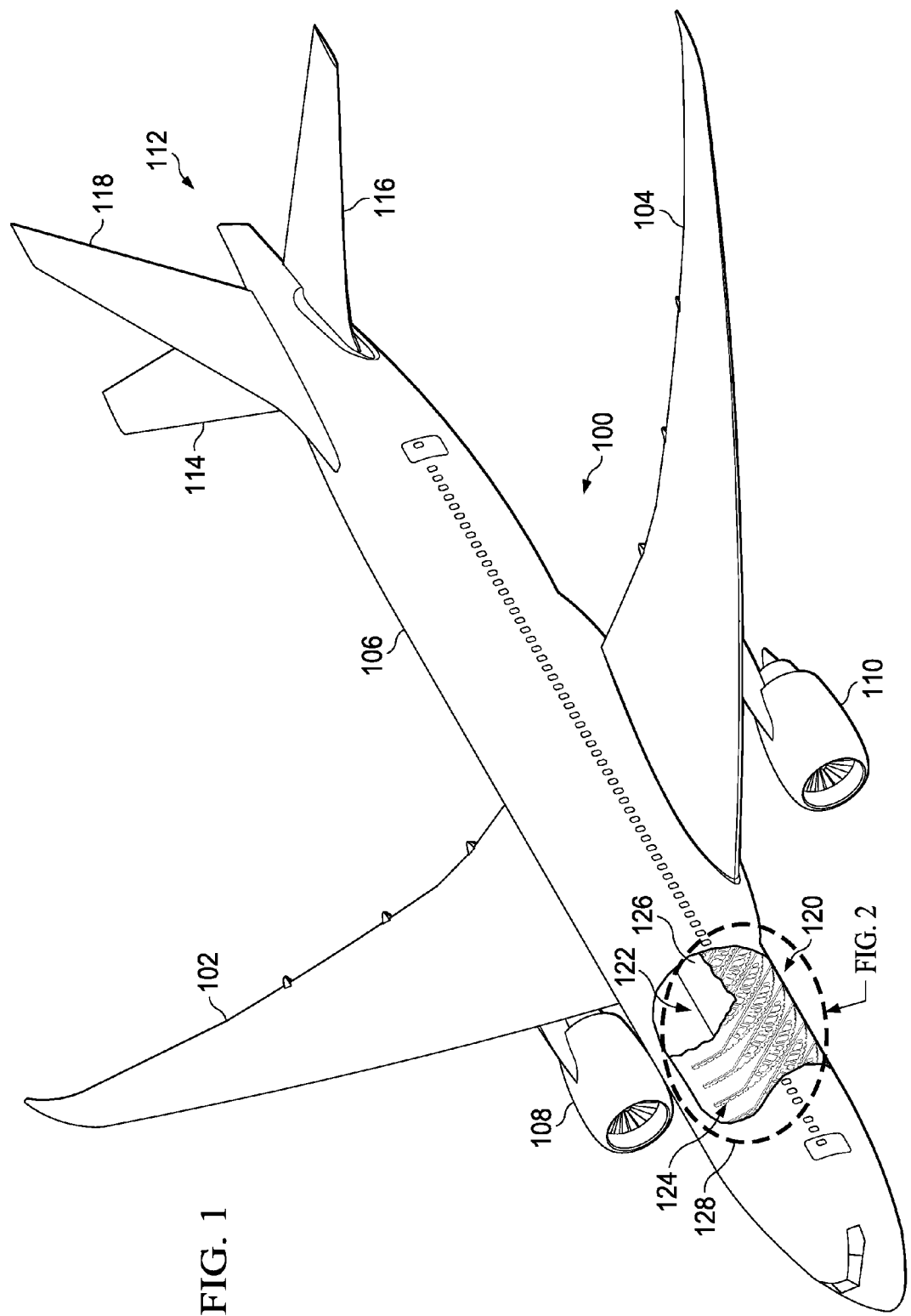
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has tail section 112. Horizontal stabilizer 114, horizontal stabilizer 116, and vertical stabilizer 118 are attached to tail section 112 of fuselage 106.

Aircraft 100 is an example of an aircraft in which support system 120 may be implemented in accordance with an illustrative embodiment. In this illustrative example, an exposed view of aircraft 100 is depicted. With this exposed view, interior 122 of fuselage 106 is seen with support system 120. In this illustrative example, support system 120 includes frames 124. Frames 124 are monolithic composite structures in these illustrative examples.

As depicted, frames 124 support floor 126 within interior 122 of aircraft 100. Additionally, frames 124 also may provide support for fuselage 106. In these illustrative examples, frames 124 may be connected to both floor 126 and fuselage 106. In particular, frames 124 may be connected to the skin of fuselage 106 or other structures for fuselage 106 depending on the particular implementation. A detailed view of section 128 of fuselage 106 is shown in the next figure.

Figure 2:
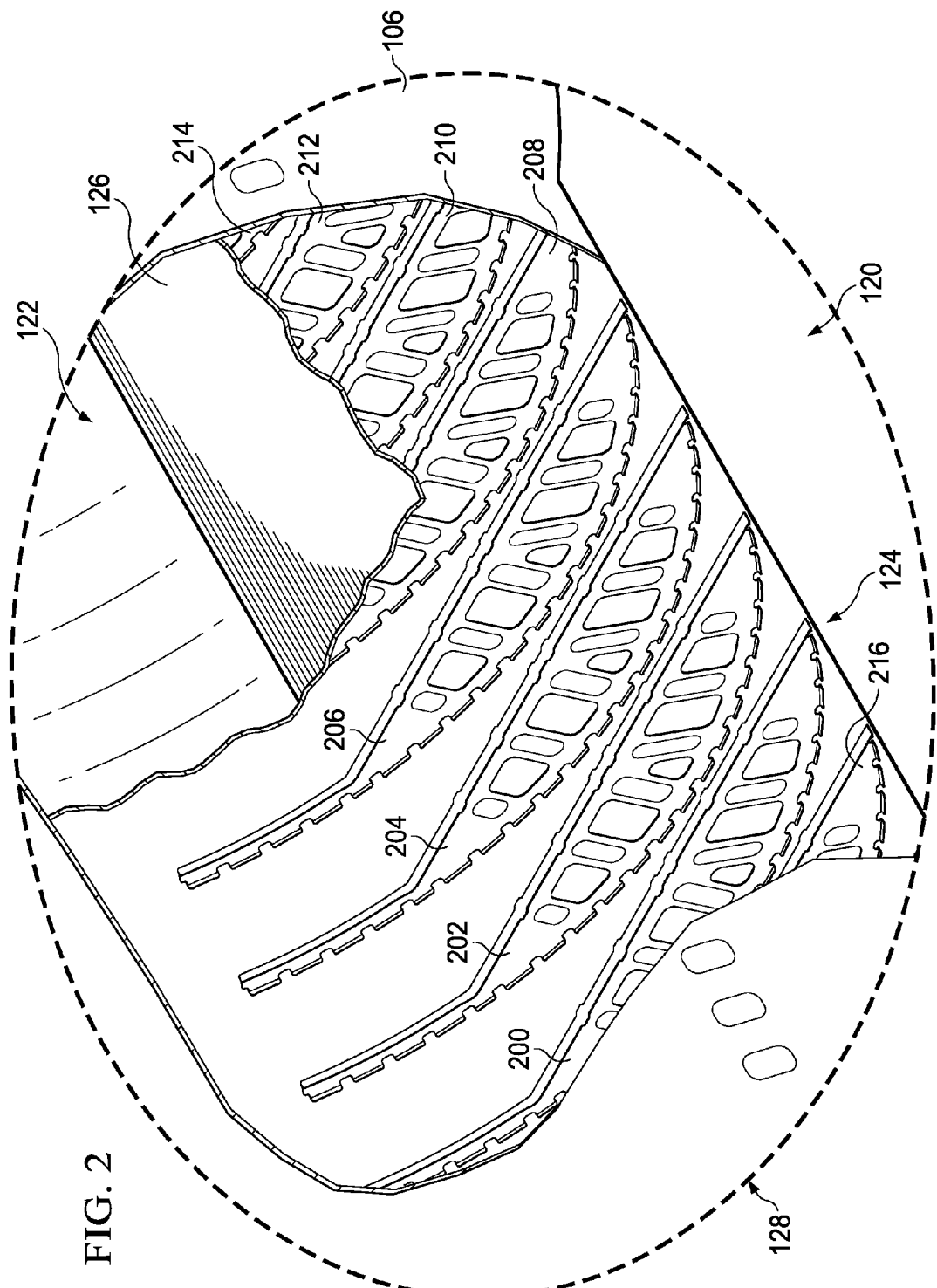
FIG. 2 is an illustration of a detailed view of a support system in accordance with an illustrative embodiment.

With reference now to FIG. 2, an illustration of a detailed view of a support system is depicted in accordance with an illustrative embodiment. In this illustrative example, more detailed illustration of frames 124 for support system 120 in interior 122 of fuselage 106 from section 128 in FIG. 1 is depicted. Frame 200, frame 202, frame 204, frame 206, frame 208, frame 210, frame 212, frame 214, and frame 216 can be seen in this exposed view of interior 122 of fuselage 106.

Figure 3:
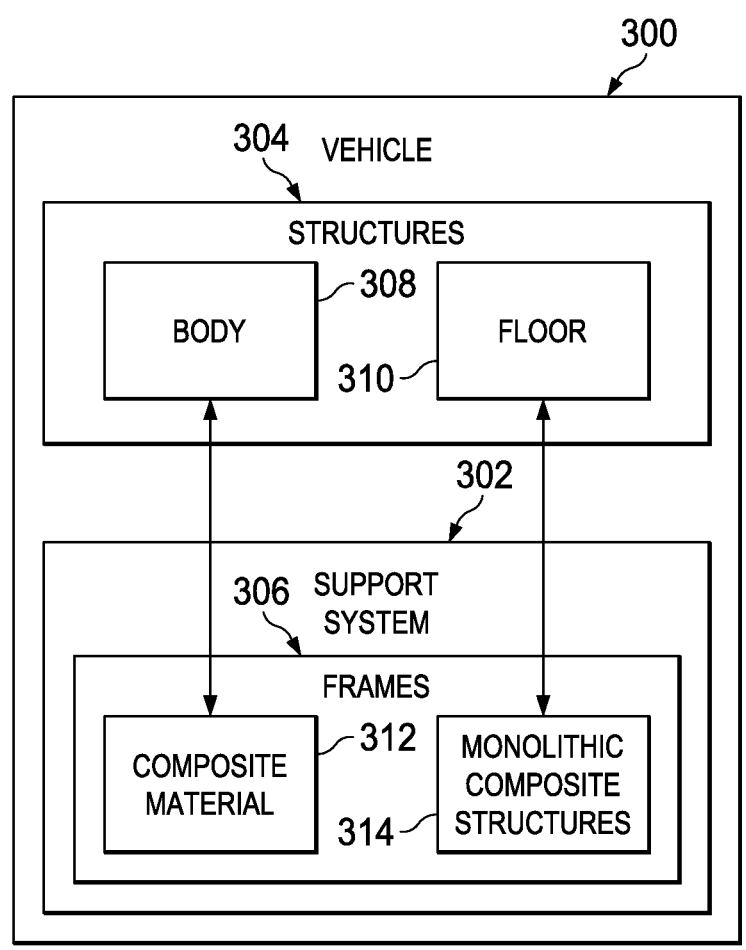
FIG. 3 is an illustration of a block diagram of a vehicle in accordance with an illustrative embodiment.

Turning now to FIG. 3, an illustration of a block diagram of a vehicle is depicted in accordance with an illustrative embodiment. In this illustrative example, aircraft 100 in FIG. 1 is an example of one physical implementation for vehicle 300 shown in block form in this figure.

As illustrated, vehicle 300 includes support system 302 as well as other components. Support system 302 is configured to provide support for a number of structures 304 within vehicle 300. As used herein, a "number of" when used with reference to items means one or more items. For example, a number of structures 304 is one or more of structures 304.

In particular, support system 302 includes frames 306. Frames 306 are configured to provide support for the number of structures 304 within vehicle 300. For example, frames 306 may provide support for body 308 in structures 304 for vehicle 300.

As depicted, body 308 is a structure within structures 304 in which components, passengers, cargo, and other objects may be located. In these illustrative examples, body 308 may be a main body for vehicle 300. Body 308 may be, for example, without limitation, a fuselage, a hull, or some other body for vehicle 300.

In addition, frames 306 may provide support for other structures within structures 304 in vehicle 300 in addition to or in place of body 308. For example, frames 306 may provide support for floor 310 within vehicle 300. Floor 310 may be, for example, without limitation, a floor for an area such as a passenger compartment, a cargo area, a flight deck, an avionics compartment, or some other suitable area.

In these illustrative examples, frames 306 are comprised of composite material 312. Composite material 312 may be comprised of a matrix and a reinforcement. The reinforcement may be comprised of fibers in the form of plies, tape, cloth, tows, and other suitable forms of fibers. The reinforcement may be filled or impregnated with a matrix in the form of a resin. The layers of reinforcement may be layed up. The resin may be added before or after the layers are layed up. This combination of materials may then be cured to form frames 306.

In particular, frames 306 may be monolithic composite structures 314. In other words, each frame in frames 306 may be comprised of a single structure.

In other words, different components are not connected to each other to form a frame in frames 306. As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

When frames 306 take the form of monolithic composite structures 314, frames 306 are formed through a single cure in some illustrative examples. With a single cure, secondary bonding of components does not occur and re-curing of frames 306 is not performed.

With the use of frames 306 in support system 302, the time needed to manufacture and install frames 306 may be reduced as compared to currently used support systems. Additionally, the cost for vehicle 300 also may be reduced with the use of frames 306 in support system 302.

Figure 4:
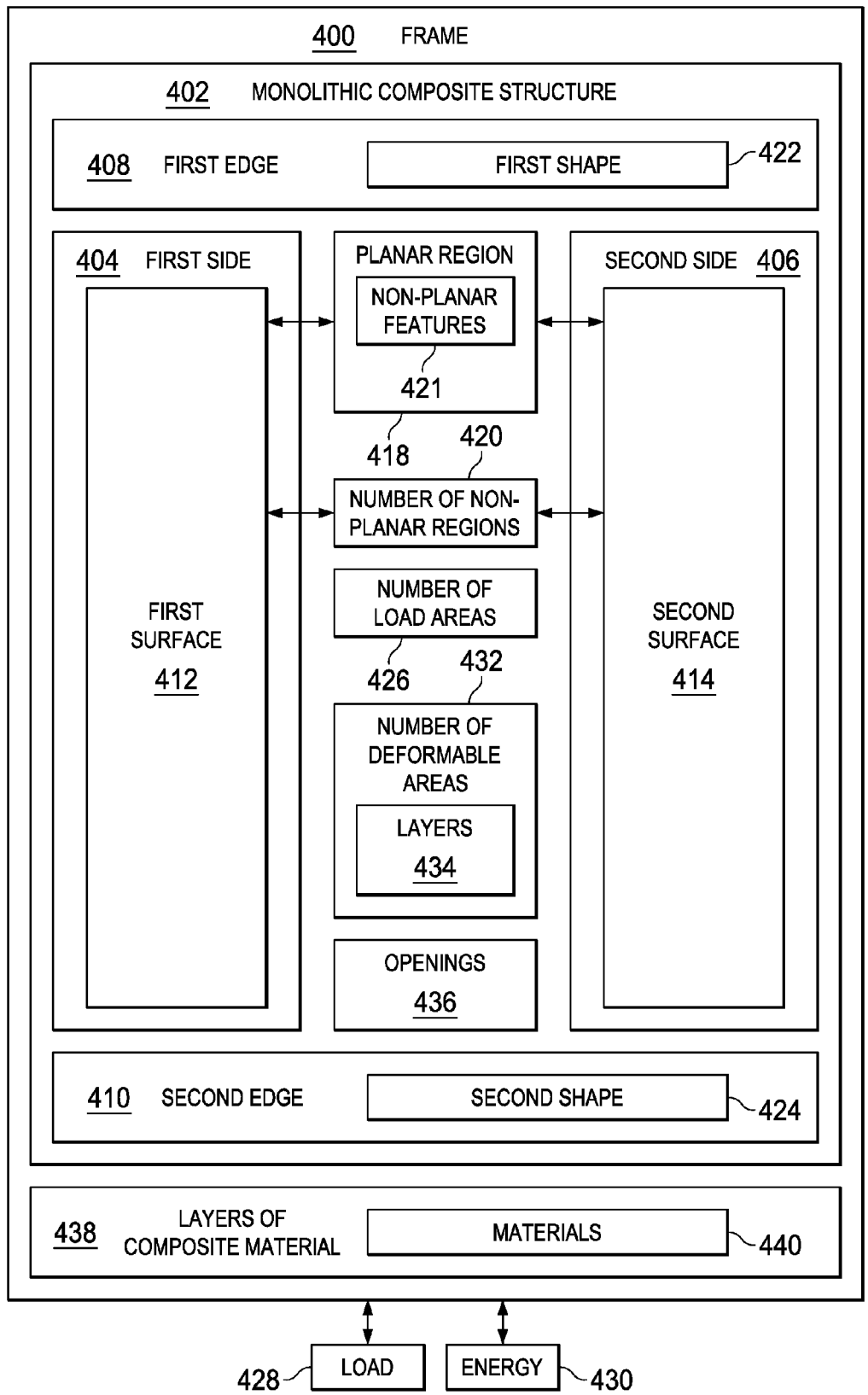
FIG. 4 is an illustration of a block diagram of a frame in accordance with an illustrative embodiment.

Turning now to FIG. 4, an illustration of a block diagram of a frame is depicted in accordance with an illustrative embodiment. In this illustrative example, frame 400 is an example of a frame in frames 306 in FIG. 3.

As depicted, frame 400 is comprised of monolithic composite structure 402. Monolithic composite structure 402 is substantially planar in shape in these illustrative examples. In some illustrative examples, monolithic composite structure 402 may have non-planar features.

Frame 400 has first side 404, second side 406, first edge 408, and second edge 410 in these illustrative examples. First side 404 and second side 406 are opposite to each other. In this illustrative example, first side 404 has first surface 412, and second side 406 has second surface 414. First surface 412 and second surface 414 are substantially planar surfaces. In some examples, these surfaces may not be planar while monolithic composite structure 402 has a substantially planar shape. In other words, the overall form of monolithic composite structure 402 may be substantially planar but surfaces, such as first surface 412 and second surface 414, may have a configuration that is not planar.

In this illustrative example, first surface 412 and second surface 414 include planar region 418. Additionally, first surface 412 and second surface 414 also may include number of non-planar regions 420. Number of non-planar regions 420 is one or more non-planar regions within planar region 418. Moreover, planar region 418 of first surface 412 and second surface 414 may include non-planar features 421.

Non-planar features 421 may be features on first surface 412 and second surface 414 that may increase the strength or provide desired parameters for the performance of frame 400. For example, a sine wave pattern may be present on or within frame 400. When a sine wave pattern is present on frame 400, first surface 412 and second surface 414 may be non-planar surfaces. When a sine wave pattern is used within the interior of frame 400, first surface 412 and second surface 414 may still have planar region 418. Thus, non-planar features 421 may be present in frame 400 without altering planar region 418 or first surface 412 and second surface 414.

In some illustrative examples, number of non-planar regions 420 also may contain non-planar features. Of course, other non-planar features other than a sine wave pattern may be used depending on the particular implementation.

As depicted, first edge 408 has first shape 422 and second edge 410 has second shape 424. First shape 422 is configured to support a structure in structures 304 in FIG. 3. For example, first shape 422 may be configured to support floor 310 within structures 304 of vehicle 300 in FIG. 3.

Second edge 410 has second shape 424 that is configured to be connected to another structure in structures 304. This other structure may be, for example, a structure such as body 308 for vehicle 300 in FIG. 3.

Additionally, monolithic composite structure 402 also includes number of load areas 426. Number of load areas 426 may be located in monolithic composite structure 402 between first edge 408 and second edge 410 of monolithic composite structure 402 for frame 400.

In these illustrative examples, number of load areas 426 is configured to carry load 428. Load 428 may be a load applied to frame 400 during operation of vehicle 300 in FIG. 3. In these illustrative examples, number of load areas 426 may be in number of non-planar regions 420.

In these particular examples, when number of non-planar regions 420 are configured to function as number of load areas 426, number of non-planar regions 420 may be elongated regions. In particular, these elongated regions may take the form of beads that are non-planar regions on both first surface 412 and second surface 414.

In these illustrative examples, monolithic composite structure 402 for frame 400 may also be configured to dissipate energy 430 that may be caused from an impact to vehicle 300 in FIG. 3. In particular, monolithic composite structure 402 may include number of deformable areas 432.

Number of deformable areas 432 may include at least one of number of non-planar regions 420 and planar region 418 depending on the particular implementation. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

Number of deformable areas 432 may deform in shape when dissipating energy 430 that may be applied to monolithic composite structure 402. Number of deformable areas 432 may be formed through configuration of layers 434 within number of deformable areas 432 in monolithic composite structure 402.

Additionally, monolithic composite structure 402 also may include a number of openings 436. The number of openings 436 may be formed for a number of different reasons. For example, the number of openings 436 may be formed to reduce weight of frame 400.

Openings 436 also may be formed to aid in the creation of number of deformable areas 432 in monolithic composite structure 402. The selection of the size and location of openings 436 may be based on the amount of energy dissipation that may be desired.

Further, openings 436 may provide access for various purposes. For example, openings 436 may provide access for maintenance, inspection, or both maintenance and inspection. Additionally, openings 436 may also provide access for other components in vehicle 300. These components may be, for example, without limitation, at least one of wires, fluid lines, optical lines, wiring, linkages, and other suitable components.

In these illustrative examples, openings 436 may be formed during lay up of layers of composite material 438 used to form monolithic composite structure 402 for frame 400. In other illustrative examples, openings 436 may be formed after layers of composite material 438 have been cured.

In these illustrative examples, frame 400 is formed as a single component. In other words, monolithic composite structure 402, first side 404, second side 406, first edge 408, second edge 410, and other features in frame 400 are formed as a single component. As a result, different features and parts of frame 400 are not fastened or bonded together to form frame 400.

In these illustrative examples, layers of composite material 438 form the different components in frame 400. Layers of composite material 438 are layed up and cured at the same time. In other words, a single cure is performed to manufacture frame 400 in these illustrative examples. Laying up layers of composite material 438 for different parts of frame 400 and placing those materials together to be cured at the same time through co-curing may also be considered to be a single cure. In other words, layers of composite material 438 are not cured at a second point in time after a first curing of layers of composite material 438 has occurred.

Additionally, frame 400 also may include materials 440. Materials 440 may be located within or between layers of composite material 438. Materials 440 may take various forms. For example, without limitation, materials 440 may be foam, plastic, metal, a filler material, a honeycomb core, and other suitable types of materials. The use of materials 440 may be used for a number of different purposes. For example, materials 440 may be used to create at least one of planar region 418, number of non-planar regions 420, number of load areas 426, number of deformable areas 432, and other suitable areas or structures in monolithic composite structure 402 for frame 400.

The selection of materials 440 may be made to reduce weight for frame 400, increase strength for portions of frame 400, create number of deformable areas 432, and for other suitable purposes. Materials 440 are included with layers of composite material 438 such that materials 440 are present during the curing of layers of composite material 438 to form monolithic composite structure 402 for frame 400.

In this manner, monolithic composite structure 402 with planar region 418, number of non-planar regions 420, and/or non-planar features 421 on first surface 412 and second surface 414 is a substantially planar composite structure. In other words, monolithic composite structure 402 has a shape that is substantially planar even if first surface 412 and/or second surface 414 of monolithic composite structure 402 are not planar.

The illustration of vehicle 300 and support system 302 for vehicle 300 and the different components in FIG. 3 and FIG. 4 are not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, openings 436 may be absent from frame 400. In other illustrative examples, openings 436 may be present in some implementations of frame 400 and not others for use in forming frames 306 in support system 302 in FIG. 3. In these illustrative examples, support system 302 has been described as being used with a vehicle such as aircraft 100 in FIG. 1. Support system 302 may be used with other types of vehicles. For example, without limitation, support system 302 may be used with a vehicle selected from one of a rotorcraft, an airship, a hovercraft, a ship, a surface ship, a submarine, an amphibious vehicle, a spacecraft, a space shuttle, a bus, a train, military vehicles, commercial vehicles, and other suitable vehicles.

Figure 5:
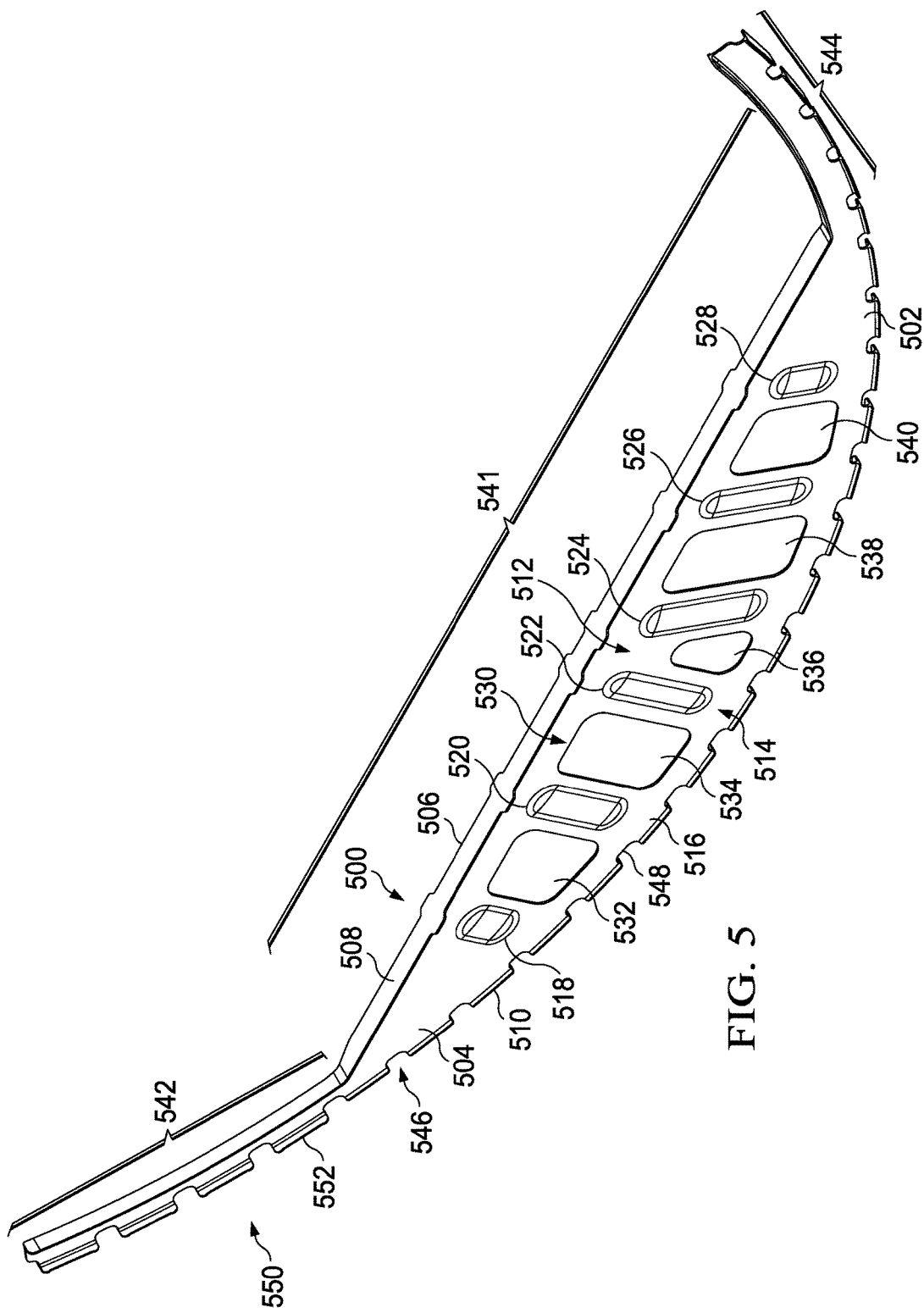
FIG. 5 is an illustration of a frame in accordance with an illustrative embodiment.

With reference now to FIG. 5, an illustration of a frame is depicted in accordance with an illustrative embodiment. Frame 500 is one example of a physical implementation of frame 400 shown in block form in FIG. 4. An isometric view of frame 500 is shown in this figure. As depicted, frame 500 takes the form of monolithic composite structure 502.

As depicted, frame 500 has first side 504, second side 506, first edge 508, and second edge 510. In these illustrative examples, frame 500 is an example of a frame that may be used within aircraft 100 in FIG. 1. In particular, frame 500 is an example of a frame within frames 124 shown for support system 120 in FIG. 1.

In this illustrative example, first edge 508 is configured to support a structure within aircraft 100 such as floor 126 in FIG. 1. As can be seen, first edge 508 is substantially planar and is configured to support components for floor 126 in aircraft 100. As depicted, first edge 508 on monolithic composite structure 502 may have a T-shape. Second edge 510 has a curved shape that is configured to be connected to the interior of fuselage 106. Of course, second edge 510 may have other shapes depending on the shape of fuselage 106. In these illustrative examples, second edge 510 in frame 500 may function as a keel frame to provide support for fuselage 106 in aircraft 100 in FIG. 1.

Additionally, as can be seen in this particular example, frame 500 includes regions where the frame is substantially planar and regions where frame 500 is non-planar. As depicted, planar region 512 and non-planar regions 514 are present on first surface 516 of first side 504. In particular, non-planar regions 514 include non-planar region 518, non-planar region 520, non-planar region 522, non-planar region 524, non-planar region 526, and non-planar region 528. As depicted, non-planar regions 514 are raised above planar region 512.

In these illustrative examples, a corresponding planar region and non-planar region are present on a second surface on second side 506. The corresponding planar region and non-planar regions are not seen in this view of frame 500.

As depicted, non-planar regions 514 may form load areas for frame 500. When non-planar regions 514 are configured as load areas, non-planar regions 514 may support loads that may be applied to frame 500 during operation of aircraft 100 in FIG. 1.

Additionally, at least one of non-planar regions 514 and portions of planar region 512 may be configured to function as deformable areas in these illustrative examples. As depicted, the deformable areas may be formed in at least one of non-planar regions 514 and portions of planar region 512 through the selection of at least one of a number of layers of composite material, an orientation for a number of layers of composite material, and other suitable parameters. For example, the number of layers of composite material and the orientations of the number of layers of composite material may be selected such that the deformable areas are more likely to be deformed before other areas in frame 500.

These deformable areas may deform when energy generated by an impact or from some other source is applied to frame 500. The deformation of these deformable areas may result in absorption of the energy applied to frame 500.

This selection of the deformable areas and their locations in frame 500 may be made such that energy is absorbed by frame 500. As a result, the amount of energy passed on to other structures may be reduced. This absorption of energy may reduce energy being transferred to other areas such as a passenger area or a cargo area.

In these illustrative examples, frame 500 also includes openings 530. Openings 530 are formed within monolithic composite structure 502. In these illustrative examples, openings 530 include opening 532, opening 534, opening 536, opening 538, and opening 540. Openings 530 may be formed within monolithic composite structure 502 to provide access for a number of different reasons.

For example, openings 530 may be present for providing access for maintenance, inspection, wiring bundles, optical lines, fluid lines, and other components that may be found within aircraft 100 in FIG. 1. Further, openings 530 also may provide decompression venting in the event that a compartment is closed off in an area in which frame 500 is located.

In this illustrative example, section 541 is configured to support a structure such as floor 126 in aircraft 100 in FIG. 1. In this example, section 541 of first edge 508 may function as a beam or other support structure in frame 500.

Additionally, first edge 508 may also support other structures. For example, section 542 and section 544 of first edge 508 may be configured to support panels above floor 126 in interior 122 of aircraft 100 in FIG. 1.

In another illustrative example, second edge 510 also may include channels 546. These channels may be formed within second edge 510 to conform to structures, such as stringers within fuselage 106 of aircraft 100 in FIG. 1. For example, channel 548 in channels 546 may be shaped to conform to or allow a stringer to pass through channel 548.

In other illustrative examples, channels 546 may not be present. In yet other illustrative examples, channel 548 may not conform to or allow a stringer to pass through channel 548. Other features, such as fluid lines or fasteners may pass through any of channels 546. When frame 500 is used in other structures other than a fuselage of an aircraft, channels 546 may be used to allow access for transport elements or for other suitable purposes within aircraft 100 in FIG. 1.

Second edge 510 also has plurality of flanges 550. Plurality of flanges 550 may provide structures for use in connecting second edge 510 to another structure. For example flange 552 in plurality of flanges 550 may be connected to fuselage 106.

In still other illustrative examples, first side 504 may have a surface that is non-planar. For example, first side 504 may have a shape of a sine wave pattern. As another example, first side 504 may not contain non-planar regions 514.

Figure 6:
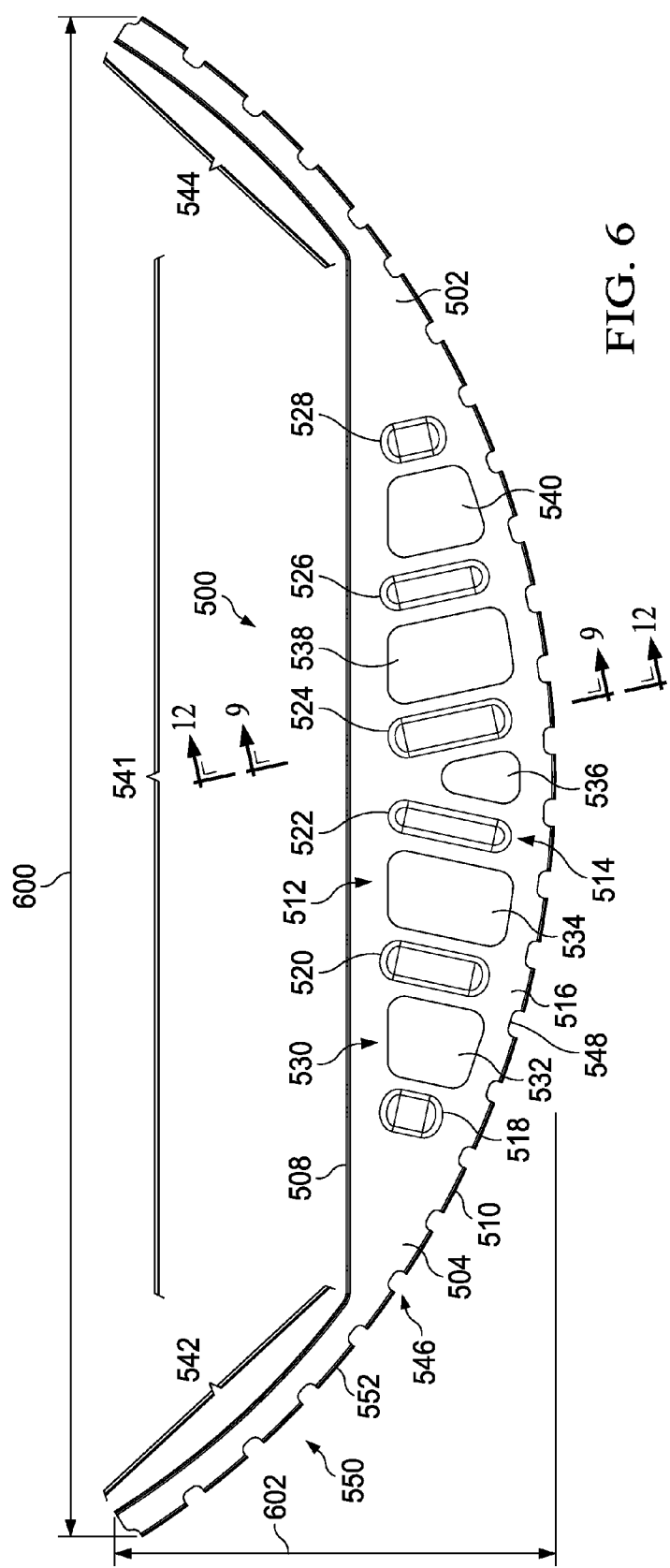
FIG. 6 is an illustration of a side view of a frame in accordance with an illustrative embodiment.

Turning now to FIG. 6, an illustration of a side view of a frame is depicted in accordance with an illustrative embodiment. In this depicted example, first side 504 of frame 500 is shown.

As depicted, frame 500 has length 600 and height 602. Length 600 may be, for example, about 184 inches, while height 602 may be about 53 inches. Of course, length 600 and height 602 may have different values depending on the design of a platform, such as aircraft 100 in FIG. 1. Further, when frame 500 is used in aircraft 100, frame 500 may have different sizes depending on the location of frame 500 in fuselage 106 in aircraft 100. For example, frame 500 may be smaller in tail section 112 of fuselage 106 as compared to other sections of fuselage 106, such as those near wing 102 and wing 104 in FIG. 1.

Figure 7:
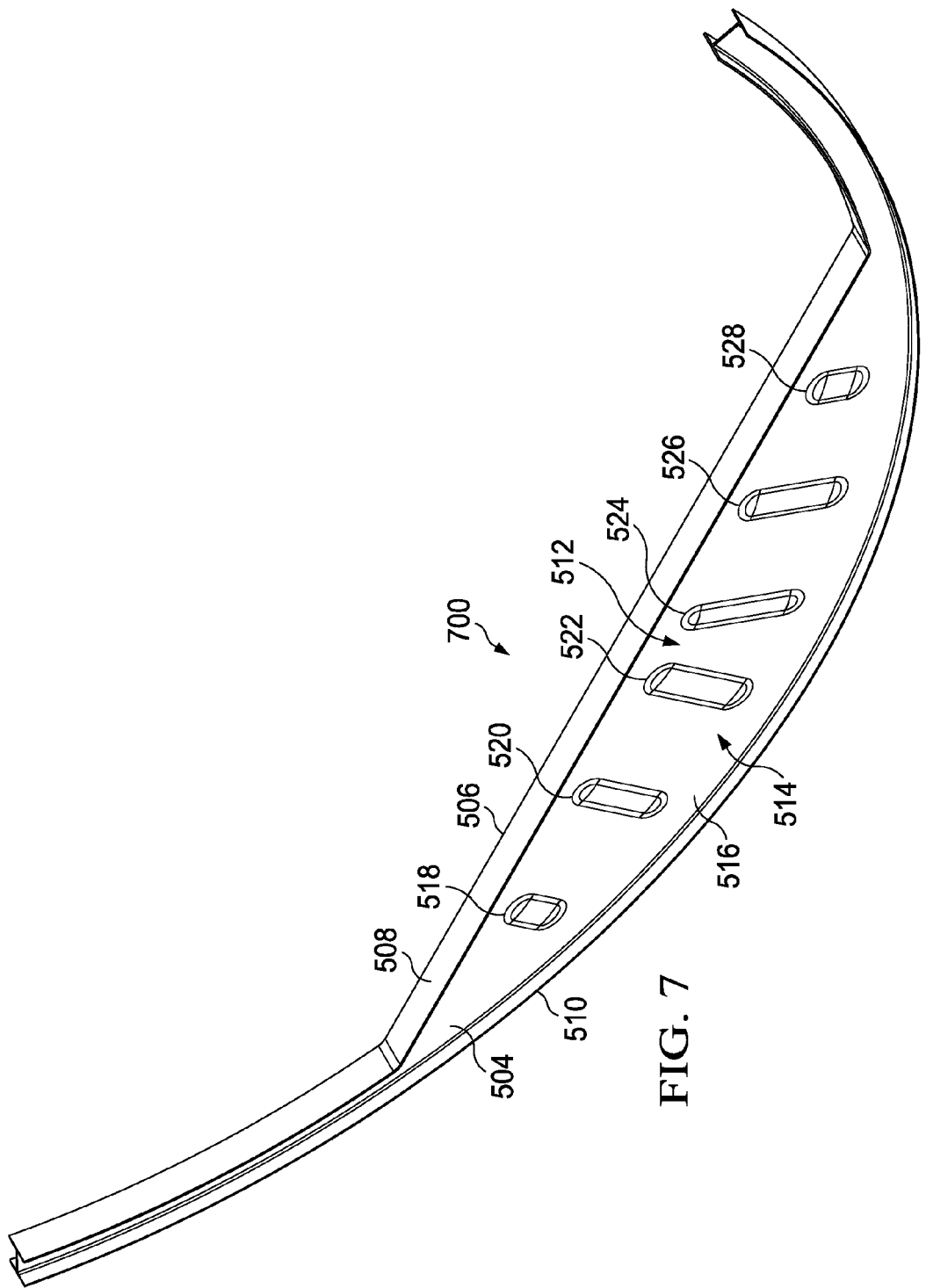
FIG. 7 is an illustration of an untrimmed frame in accordance with an illustrative embodiment.

Turning now to FIG. 7, an illustration of an untrimmed frame is depicted in accordance with an illustrative embodiment. Untrimmed frame 700 may be one example of frame 500 before frame 500 has been trimmed to include openings 530, channels 546, or other features of frame 500 depicted in FIG. 5 and FIG. 6.

In this illustrative example, non-planar regions 514 are present in untrimmed frame 700. As depicted, first surface 516 of first side 504 is substantially planar. Of course, the surface of untrimmed frame 700 may include non-planar features, depending on the particular implementation.

Although untrimmed frame 700 is depicted with non-planar regions 514 present on untrimmed frame 700 in these illustrative examples, other examples of untrimmed frame 700 may not include non-planar regions 514. Further, other features in addition to non-planar regions 514 may be present in untrimmed frame 700. In still other illustrative examples, trimming of untrimmed frame 700 may be unnecessary.

Figure 8:
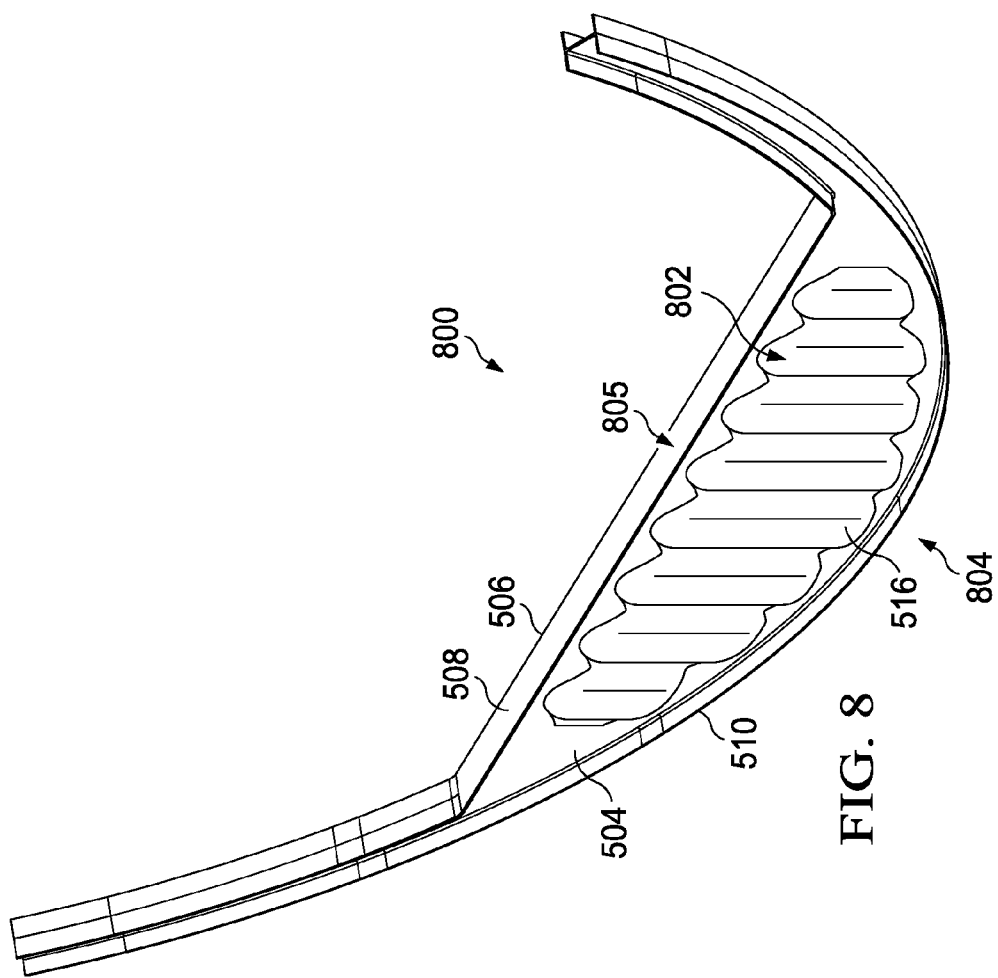
FIG. 8 is an illustration of a frame in accordance with an illustrative embodiment.

Turning now to FIG. 8, an illustration of a frame is depicted in accordance with an illustrative embodiment. Frame 800 is another example of a physical implementation of frame 400 shown in block form in FIG. 4. An isometric view of frame 800 is shown in this figure. As depicted, frame 800 takes the form of monolithic composite structure 802.

As depicted, frame 800 has sinusoidal pattern 804 on first surface 516 of first side 504. Frame 800 also may have sinusoidal pattern 805 on the surface of second side 506 in these illustrative examples. Sinusoidal pattern 804 may be selected to increase the strength of frame 800 or provide other desired features for frame 800 depending on the particular implementation. In other illustrative examples, frame 800 may have a different pattern other than sinusoidal pattern 805 for the surface of first side 504 and second side 506.

Turning now to FIG. 9, an illustration of a cross-sectional view of a frame is depicted in accordance with an illustrative embodiment. In this depicted example, a cross-sectional view of frame 500 is seen taken along lines 9-9 in FIG. 6.

In this illustrative example, non-planar region 524 is present on first surface 516 of first side 504 as well as on second surface 900 of second side 506. As depicted, non-planar region 524 is formed as a solid portion of monolithic composite structure 502. For example, additional layers in layers of composite material 902 may be present in non-planar region 524 as compared to other areas in frame 500. The actual number of layers selected for layers of composite material 902 may vary depending on the particular implementation. For example, the number of layers used and their orientation may depend on the type of plies selected, the type of resin selected, the amount of loading desired, and other suitable factors. For example, the number of layers may be about 20 layers, about 40 layers, about 75 layers, or some other number of layers.

As depicted, non-planar region 524 may be a load area for frame 500. In other words, non-planar region 524 may be configured to support loads that may be applied to frame 500. In still other illustrative examples, non-planar region 524 may also be part of a deformable area that is configured to absorb energy through deformation. A more detailed illustration of section 904 of frame 500 is shown in FIG. 10 and a more detailed illustration of section 905 of frame 500 is shown in FIG. 11.

Turning now to FIG. 10, an illustration of a detailed view of an edge of a frame is depicted in accordance with an illustrative embodiment. In this illustrative example, a more detailed illustration of section 904 in FIG. 9 is shown.

As depicted, first edge 508 has a T-shape. In this illustrative example, layers of composite material 902 are configured to form first edge 508 of frame 500. In addition to layers of composite material 902, noodle 1004 also is included within layers of composite material 902. In this illustrative example, noodle 1004 is a number of layers of composite material configured as a filler for radius 1006 at first edge 508. The plies are laid in a manner such that the plies encapsulate noodle 1004. Further, noodle 1004 may or may not include an adhesive material wrap during the curing process. This adhesive material wrap may increase the integrity of the bond between plies in layers of composite material 902.

In this illustrative example, noodle 1004 has a triangular cross section. Noodle 1004 may be employed to fill gap 1008 in layers of composite material 902, combining all surfaces together. Noodle 1004 may be employed to increase the strength of first edge 508. Further, noodle 1004 also may be used to reduce delamination and distortion for radius 1006.

Turning now to FIG. 11, an illustration of a detailed view of an edge of a frame is depicted in accordance with an illustrative embodiment. In this illustrative example, a more detailed illustration of section 905 in FIG. 9 is shown.

As depicted, second edge 510 has a T-shape. In this illustrative example, layers of composite material 902 are configured to form second edge 510 of frame 500. In addition to layers of composite material 902, noodle 1104 also is included within layers of composite material 902. In this illustrative example, noodle 1104 is comprised of a number of layers of composite material configured as a filler for radius 1106 at second edge 510. Further, noodle 1104 may or may not include an adhesive material wrap during the curing process. This adhesive material wrap may increase the integrity of the bond between plies in layers of composite material 902.

In this illustrative example, noodle 1104 has a triangular cross section. Noodle 1104 may be employed to fill gap 1108 in layers of composite material 902, combining all surfaces together. Noodle 1104 may be employed to increase the strength of second edge 510. Further, noodle 1104 also may be used to reduce delamination and distortion for radius 1106.

With reference next to FIG. 12, an illustration of a cross-sectional view of a frame is depicted in accordance with an illustrative embodiment. In this depicted example, a cross-sectional view of frame 500 is seen taken along lines 12-12 in FIG. 6. This cross-sectional view of frame 500 is an example of another implementation of frame 500.

In this illustrative example, non-planar region 524 is present on both first surface 516 of first side 504 and second surface 1200 of second side 506. In this illustrative example, non-planar region 524 is not a solid portion of monolithic composite structure 502 as compared to the implementation illustrated for frame 500 as shown in the cross-sectional view in FIG. 9.

Instead, non-planar region 524 includes filler material 1202. Filler material 1202 is located between layers of composite material 1206 in section 1208 of frame 500 in this illustrative example. Filler material 1202 may be selected from a number of different types of materials. For example, without limitation, filler material 1202 may be selected from one of foam, plastic, metal, a honeycomb core, and other suitable types of filler materials. A more detailed illustration of section 1208 is shown in FIG. 13.

Turning now to FIG. 13, a more detailed illustration of a portion of a cross-sectional view of a frame is depicted in accordance with an illustrative embodiment. In this figure, a more detailed view of section 1208 in FIG. 12 is shown.

As depicted, filler material 1202 is located in section 1300 and section 1302 of frame 500. Section 1300 and section 1302 are located between layers of composite material 1206. Of course, this illustration of the placement of filler material 1202 is only for purposes of illustration and not meant to limit the manner in which filler material 1202 may be placed between layers of composite material 1206. In another illustrative example, only one section of filler material 1202 may be present instead of two sections of filler material 1202.

Figure 14:
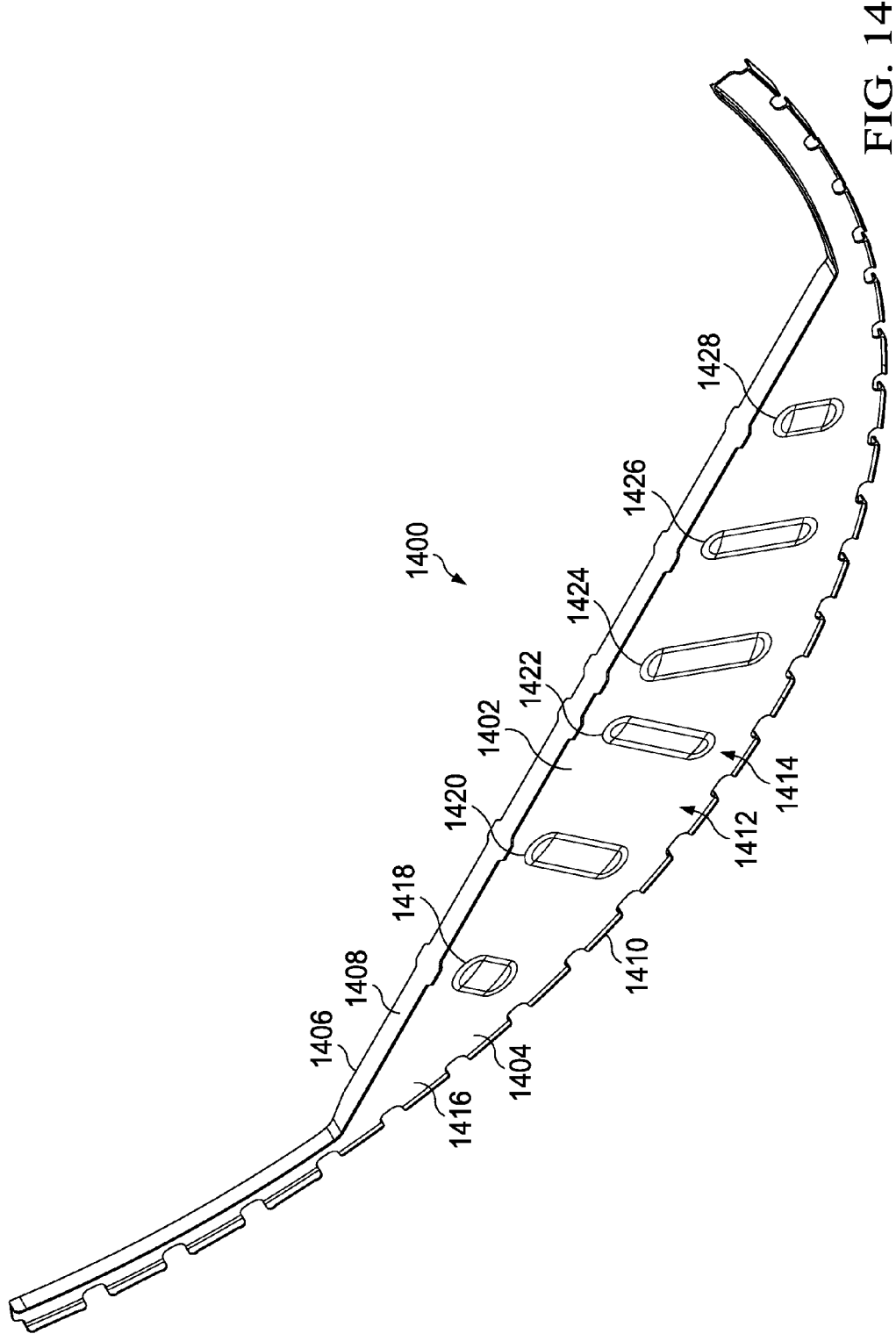
FIG. 14 is an illustration of a frame in accordance with an illustrative embodiment.

Turning now to FIG. 14, an illustration of a frame is depicted in accordance with an illustrative embodiment. In this illustrative example, frame 1400 is another example of a physical implementation of frame 400 shown in block form in FIG. 4. An isometric view of frame 1400 is shown in this figure. As depicted, frame 1400 takes the form of planar composite structure 1402. Of course, frame 1400 may contain non-planar features in some illustrative examples.

As depicted, frame 1400 has first side 1404, second side 1406, first edge 1408, and second edge 1410. As depicted, frame 1400 is another example of a frame that may be used to implement frames 124 in support system 120 within aircraft 100 in FIG. 1.

In this illustrative example, first edge 1408 is configured to support a structure within aircraft 100 such as floor 126. As can be seen, first edge 1408 is substantially planar and is configured to support components for floor 126 in aircraft 100 in FIG. 1. As depicted, first edge 1408 on planar composite structure 1402 may have a T-shape. Second edge 1410 has a curved shape that is configured to be connected to the interior skin of fuselage 106 of aircraft 100.

As depicted, frame 1400 includes planar region 1412 and non-planar regions 1414 on first surface 1416 of first side 1404. In particular, non-planar regions 1414 include non-planar region 1418, non-planar region 1420, non-planar region 1422, non-planar region 1424, non-planar region 1426, and non-planar region 1428. Corresponding non-planar regions are found on a second surface on second side 1406 that are not seen in this view of frame 1400. Non-planar regions 1414 may form load areas for frame 1400 to support loads that may be applied to frame 1400 during operation of aircraft 100 in FIG. 1.

In this particular illustrative example, openings are absent in planar composite structure 1402 for frame 1400. Openings are optional and may be omitted depending on the particular implementation.

Figure 15:
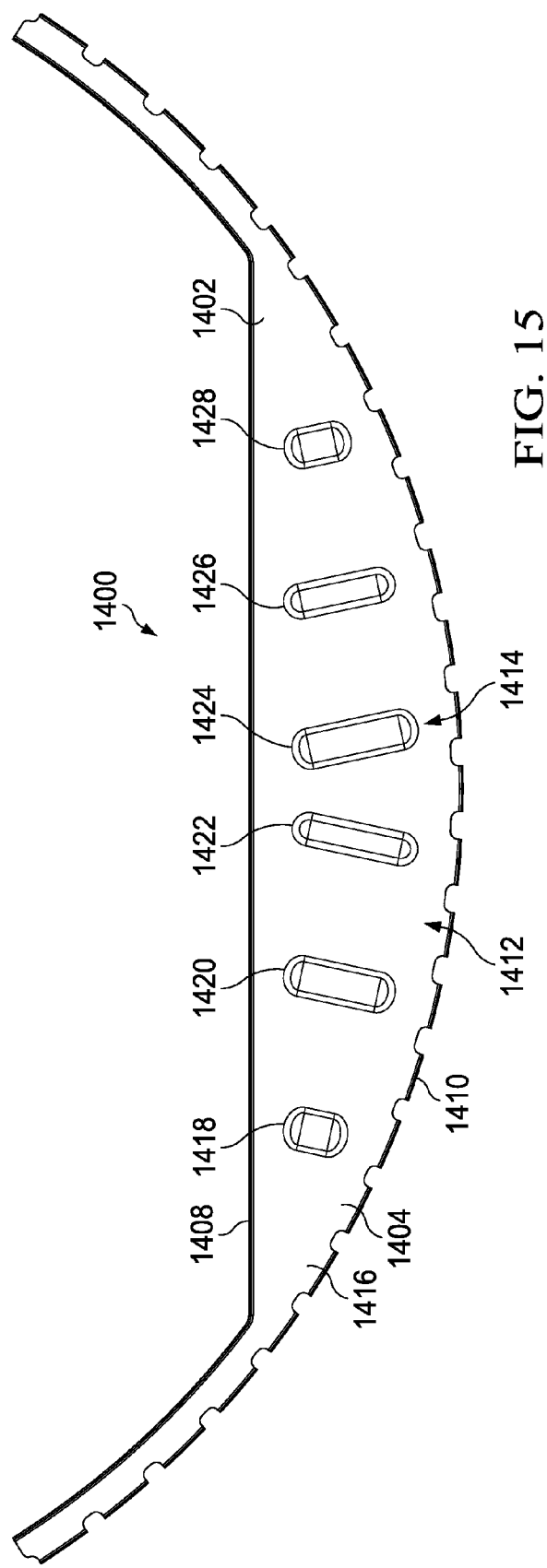
FIG. 15 is an illustration of a side view of a frame in accordance with an illustrative embodiment.

Turning now to FIG. 15, an illustration of a side view of a frame is depicted in accordance with an illustrative embodiment. In this depicted example, first side 1404 of frame 1400 of FIG. 14 is shown.

The illustrations of frames in FIGS. 4-15 are examples of physical implementations for frame 400 shown in block form in FIG. 4. The illustration of frame 500 in FIGS. 5-13 and frame 1400 in FIG. 14 and FIG. 15 are not meant to imply physical or architectural limitations to the manner in which frame 400 may be implemented.

For example, section 542 and section 544 of first edge 508 may be omitted in some illustrative examples. In still other illustrative examples, non-planar regions 1414 may be omitted from frame 1400. As another illustrative example, second edge 510 of frame 500 and second edge 1410 of frame 1400 may have a different shape other than the curved shape shown. The shape of second edge 510 and second edge 1410 may vary depending on the shape of the body or other structure to which these edges are configured to be connected to or support. In still other illustrative examples, channels 546 of frame 500 may be omitted.

In other illustrative example, first edge 508 may have a different shape other than a T-shape. For example, first edge 508 may have an L-shape or some other suitable shape.

Although the different components in FIGS. 4-15 are shown with reference to a fuselage in an aircraft, frame 400 in FIG. 4, frame 500 in FIG. 5, and frame 1400 in FIG. 14 may be used as support structures in other locations other than the fuselage of an aircraft. Further, frame 400, frame 500, and frame 1400 may not be used to support a load. For example, without limitation, frame 400, frame 500, and frame 1400 may be used for support structure in the interior of a wing of an aircraft, to connect an outer hull to an inner hull in a ship, to provide support for a bulkhead in a submarine, to provide support for a thrust plate in a spacecraft, or some other suitable purpose.

The different components shown in FIG. 1 and FIGS. 4-15 may be combined with components in FIG. 2 and FIG. 3, used with components in FIG. 2 and FIG. 3, or a combination of the two. Additionally, some of the components in FIG. 1 and FIG. 4-15 may be illustrative examples of how components shown in block form in FIG. 2-4 can be implemented as physical structures.

Figure 16:
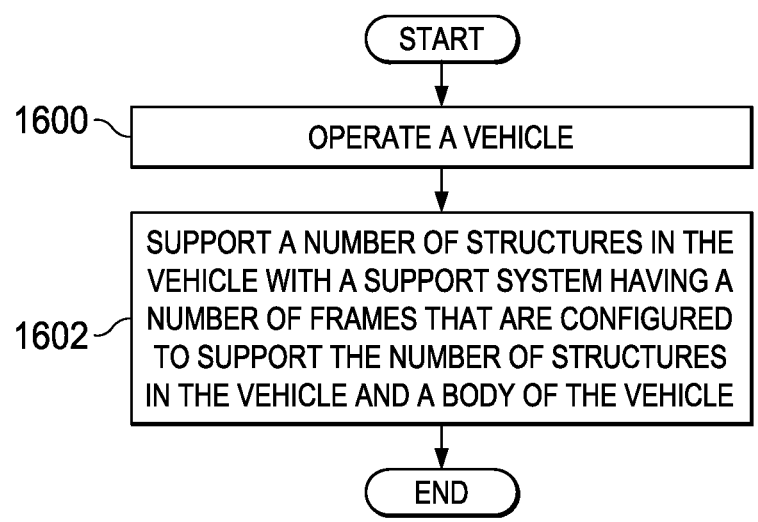
FIG. 16 is an illustration of a flowchart of a process for operating a vehicle in accordance with an illustrative embodiment.

Turning now to FIG. 16, an illustration of a flowchart of a process for operating a vehicle is depicted in accordance with an illustrative embodiment. The process illustrated in FIG. 16 may be implemented using a vehicle such as vehicle 300 in FIG. 3 and, in particular, may be implemented in aircraft 100 in FIG. 1 as one illustrative example.

The process begins by operating a vehicle (operation 1600). This operation of the vehicle may include movement of the vehicle or other operations of the vehicle in a stationary position.

Thereafter, a number of structures in the vehicle are supported with a support system having a number of frames that are configured to support the number of structures in the vehicle and a body of the vehicle (operation 1602) with the process terminating thereafter.

Figure 17:
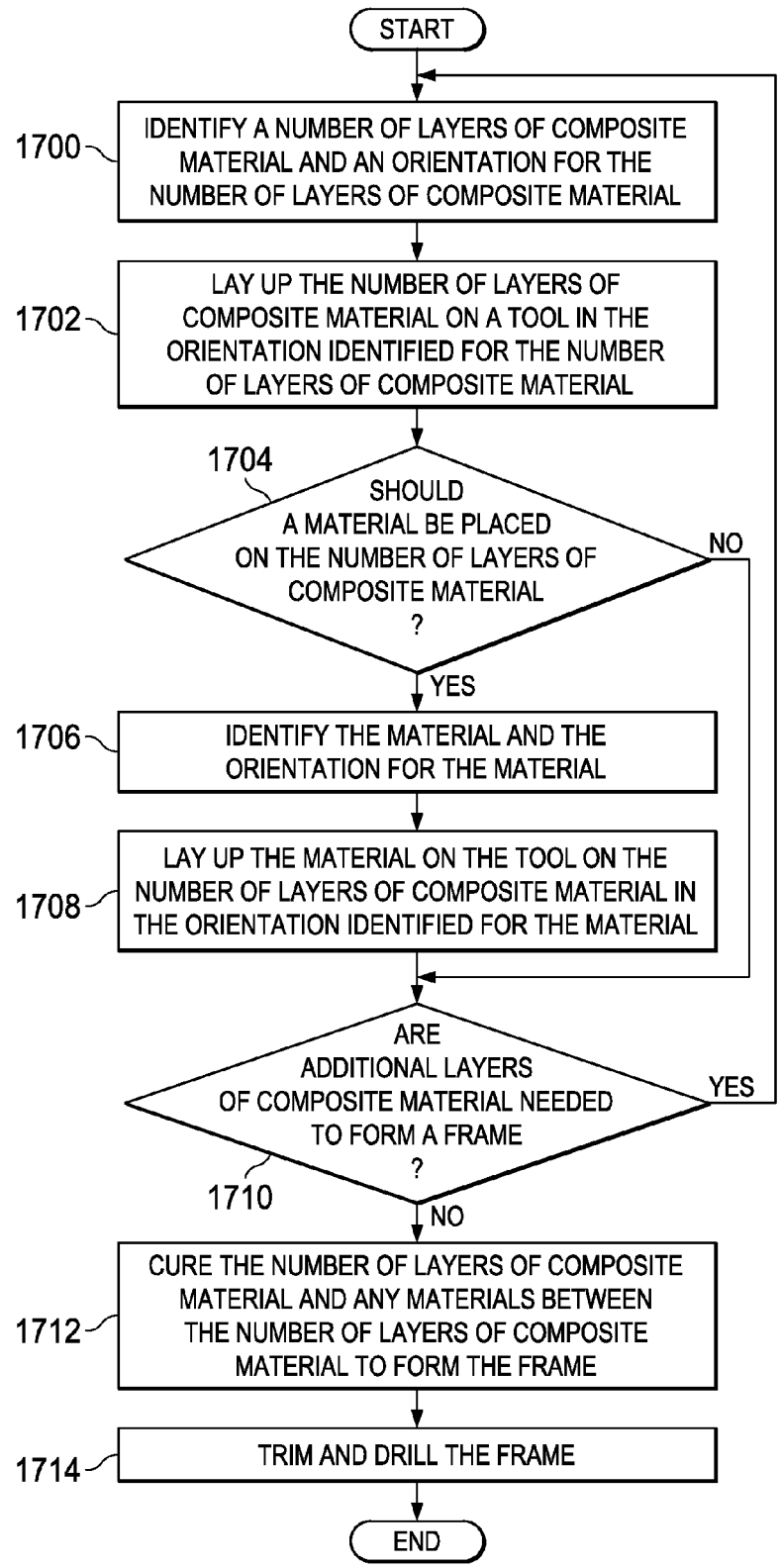
FIG. 17 is an illustration of a flowchart of a process for forming a frame in accordance with an illustrative embodiment.

Turning now to FIG. 17, an illustration of a flowchart of a process for forming a frame is depicted in accordance with an illustrative embodiment. The process illustrated in FIG. 17 may be used to manufacture a frame, such as frame 400 in FIG. 4, frame 500 in FIG. 5, and frame 1400 in FIG. 14.

The process begins by identifying a number of layers of composite material and an orientation for the number of layers of composite material (operation 1700). Next, the process lays up the number of layers of composite material on a tool in the orientation identified for the number of layers of composite material (operation 1702). These layers of composite material may already include resin infused within the layers. Layers of composite material infused with resin may be referred to as a prepreg. Further, the number of layers of composite material placed on the tool may cover a portion of the tool or all of the tool.

The process then determines whether a material should be placed on the number of layers of composite material (operation 1704). This material may be a filler or some other suitable material such as those materials described for material 440 in FIG. 4. If a material should be placed on the number of layers of composite material, the material and the orientation for the material is identified (operation 1706). The material is then layed up on the tool on the number of layers of composite material in the orientation identified for the material (operation 1708).

Next, a determination is made as to whether additional layers of composite material are needed to form a frame (operation 1710). If additional layers of composite material are needed, the process returns to operation 1700 as described above. The process may return to operation 1700 to lay up layers of composite material in different orientations.

This process of returning to operation 1700 for some number of iterations may result in different portions of the frame having different thicknesses. Further, the selection of the layers of composite material and the orientations may be used to form features including at least one of first edge 408, second edge 410, planar region 418, non-planar regions 420, number of load areas 426, number of deformable areas 432, openings 436, and other suitable features for frame 400 in FIG. 4. Of course, other features such as cap plies or noodles may be added to the layers of composite material during the process illustrated in this figure.

Otherwise, if additional layers of composite material are not needed, the process cures the number of layers of composite material and any materials between the number of layers of composite material to form the frame (operation 1712). The curing may be performed by applying heat to the number of layers of composite material layed up on the tool. This heat may be generated using an oven, autoclave, or other suitable process. Further, the number of layers of composite material may be covered with a bag and a vacuum may be applied during the curing process. Additionally, in some cases, the autoclave may be used to apply pressure to the number of layers of composite material.

Further, another tool may be placed over the tool on which the number of layers of composite material has been layed up prior to curing the number of layers of composite material. This second tool may be, for example, a caul plate or tool pressure plate.

Thereafter, the frame is trimmed (operation 1714) with the process terminating thereafter. The frame may be trimmed to remove any excess material that may be undesired. Further, the trimming of the frame may be used to form various features in the frame. For example, the frame may be trimmed to form openings, channels, and other suitable features for the frame.

With reference again to operation 1704, if the material should not be placed on the number of layers of composite material, the process proceeds to operation 1710 as described above. Other features may be added to the part for later use for assembly integration features for location and inspection and also eliminating the need for physical tooling used to position a part on assembly. For example, target locations may be scribed into the tool and transferred to the subsequent part during the curing process. Later, the target location may be laser located upon installation. Any number of target locations may be scribed into the tool and transferred to the part during the curing process.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 18:
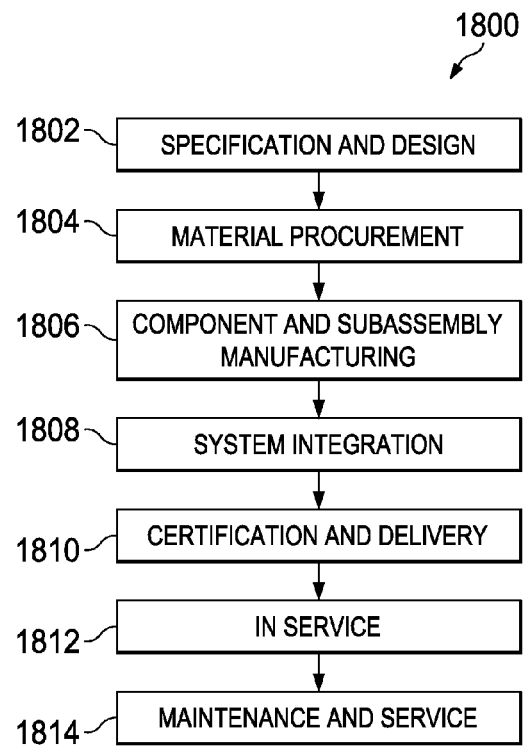
FIG. 18 is an illustration of an aircraft manufacturing and service method in accordance with an illustrative embodiment.
Figure 19:
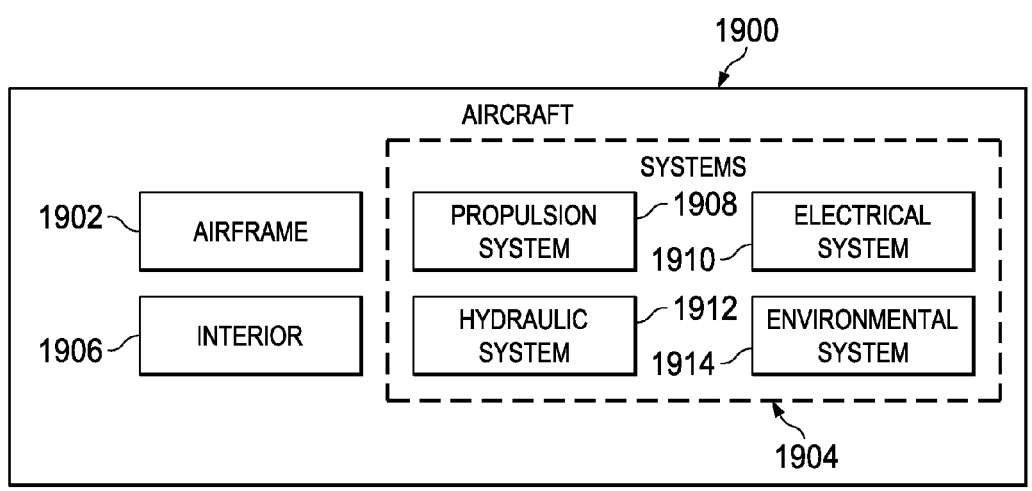
FIG. 19 is an illustration of an aircraft in which an illustrative embodiment may be implemented.

Some illustrative embodiments of the disclosure may be described in the context of aircraft manufacturing and service method 1800 as shown in FIG. 18 and aircraft 1600 as shown in FIG. 19. Turning first to FIG. 18, an illustration of an aircraft manufacturing and service method is depicted in accordance with an illustrative embodiment. This process may be used to manufacture frame 400 and/or other components shown in FIG. 4. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the ship industry and the spacecraft industry.

Apparatuses and methods embodied herein may be employed during at least one of the stages of aircraft manufacturing and service method 1800 in FIG. 18.

In one illustrative example, components or subassemblies produced in component and subassembly manufacturing 1806 in FIG. 18 may be fabricated or manufactured in a manner similar to components or subassemblies produced while aircraft 1900 is in service 1812 in FIG. 18. As yet another example, one or more apparatus embodiments, method embodiments, or a combination thereof may be utilized during production stages, such as component and subassembly manufacturing 1806 and system integration 1808 in FIG. 18. One or more apparatus embodiments, method embodiments, or a combination thereof may be utilized while aircraft 1900 is in service 1812 and/or during maintenance and service 1814 in FIG. 18. The use of a number of the different illustrative embodiments may substantially expedite the assembly of and/or reduce the cost of aircraft 1900.

Thus, the illustrative embodiments may reduce the time, expense, and effort needed to manufacture vehicles. In particular, a support system using frames in accordance with an illustrative embodiment may reduce the number of components needed to form support systems for structures in an aircraft. For example, by using frame 400 in FIG. 4, a single frame may be attached to various structures. In contrast, without frame 400, beams, beam supports, frames, shear tie angles, splice fittings, and other components may need to be assembled and connected to each other to provide functionality similar to frame 400.

In addition, frame 400 also may provide other functionalities such as energy dissipation through crushing of deformable areas, decompression venting, and other suitable functions. Moreover, frame 400 may be more easily customized for various loads that may be encountered in different portions of the vehicle. Also, with the use of frame 400, the amount of maintenance and inspections needed for support systems may be reduced. For example, inspections of fasteners, welds, and other components may be reduced through the use of frame 400. Further, the use of frame 400 may reduce a need for pre-loading of structures.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
 a monolithic composite structure having a substantially planar shape, the monolithic composite structure comprising:
  a first edge of the monolithic composite structure having a first shape, wherein the first shape is a T-shape; and
  a second edge of the monolithic composite structure having a second shape, wherein the second edge includes a plurality of flanges integrally extending from the second edge, wherein the plurality of flanges is connected to a skin of a vehicle; and
 a floor connected to the first edge, wherein the floor is supported within an interior of the vehicle by the T-shape of the first edge.

2. The apparatus of claim 1, wherein the monolithic composite structure forms a frame.

3. The apparatus of claim 1, wherein the monolithic composite structure is configured to carry a load during operation of the vehicle.

4. The apparatus of claim 1, wherein the monolithic composite structure is configured to dissipate energy from an impact to the vehicle.

5. The apparatus of claim 4 further comprising:
 a number of deformable areas in the monolithic composite structure configured to deform when dissipating the energy from the impact to the vehicle.

6. The apparatus of claim 5, wherein the number of deformable areas is selected from at least one of a non-planar region and a planar region.

7. The apparatus of claim 1 further comprising:
 a number of load areas in the monolithic composite structure located between the first edge and the second edge of the monolithic composite structure.

8. The apparatus of claim 7, wherein the number of load areas is a number of non-planar regions.

9. The apparatus of claim 1 further comprising:
 a number of openings in the monolithic composite structure.

10. The apparatus of claim 1, wherein the skin of the vehicle is selected from one of a fuselage and a hull.

11. The apparatus of claim 1, wherein the vehicle is selected from one of an aircraft, a rotorcraft, an airship, a hovercraft, a ship, a surface ship, a submarine, an amphibious vehicle, a spacecraft, a space shuttle, a bus, a train, military vehicles, and commercial vehicles.

12. A support system for an aircraft, the support system comprising:
 a plurality of frames, wherein a frame in the plurality of frames comprises a monolithic composite structure comprising:
  a first edge of the monolithic composite structure having a first shape, wherein the first shape is a T-shape; and
  a second edge of the monolithic composite structure having a second shape configured to be connected to a fuselage of the aircraft, wherein the second edge includes a plurality of flanges integrally extending from the second edge, wherein the plurality of flanges is connected to a skin of the aircraft; and
 a floor connected to the first edge, wherein the floor is supported within an interior of the aircraft by the T-shape of the first edge.

13. A method for operating a vehicle, the method comprising:
    operating the vehicle having a number of structures, wherein the number of structures is a floor in an interior of the vehicle; and
    supporting the number of structures in the vehicle with a support system having a number of frames, wherein a frame in the number of frames comprises a monolithic composite structure, the monolithic composite structure comprising:
    a first edge of the monolithic composite structure having a first shape connected to the number of structures in the vehicle, wherein the first shape is a T-shape; and
    a second edge of the monolithic composite structure having a second shape connected to a skin of the vehicle, wherein the second edge includes a plurality of flanges integrally extending from the second edge, wherein the plurality of flanges is connected to the skin of the vehicle.

14. The method of claim 13 further comprising:
    deforming a number of deformable areas in the monolithic composite structure in response to energy from an impact to the vehicle.

15. The method of claim 14, wherein the number of deformable areas is selected from at least one of a non-planar region and a planar region.

16. The method of claim 13, wherein the monolithic composite structure has a number of openings.

17. The apparatus of claim 1, wherein the floor within the interior of the vehicle is selected from the group consisting of a floor for a passenger compartment, a floor for a cargo area, a floor for a flight deck, and a floor for an avionics compartment.

18. The support system of claim 12, wherein the floor within the interior of the vehicle is selected from the group consisting of a floor for a passenger compartment, a floor for a cargo area, a floor for a flight deck, and a floor for an avionics compartment.

19. The method of claim 13, wherein the floor within the interior of the vehicle is selected from the group consisting of a floor for a passenger compartment, a floor for a cargo area, a floor for a flight deck, and a floor for an avionics compartment.

* * * * *